United States Patent
Garfunkel

(10) Patent No.: US 7,891,081 B2
(45) Date of Patent: Feb. 22, 2011

(54) PROCESS OF MANUFACTURING A SIDE PINNED MAGNETIC RECORDING SENSOR

(75) Inventor: Glen Garfunkel, San Jose, CA (US)

(73) Assignee: Headway Technologies, Inc., Milpitas, CA (US)

(*) Notice: Subject to any disclaimer, the term of this patent is extended or adjusted under 35 U.S.C. 154(b) by 681 days.

(21) Appl. No.: 10/816,040

(22) Filed: Apr. 1, 2004

(65) Prior Publication Data

US 2005/0225906 A1    Oct. 13, 2005

(51) Int. Cl.
   *G11B 5/193*    (2006.01)

(52) U.S. Cl. ............... 29/603.13; 29/603.08; 427/128; 360/324.1; 360/324.11; 428/811.2; 428/812

(58) Field of Classification Search ............ 427/128, 427/131, 132, 548; 428/811.2, 812, 815, 428/827; 360/314, 324.11, 324.12, 325, 360/324.1, 324.2; 29/603.13, 603.14, 603.07, 29/603.08; 257/659
See application file for complete search history.

(56) References Cited

U.S. PATENT DOCUMENTS

| | | | | |
|---|---|---|---|---|
| 5,465,185 A | * | 11/1995 | Heim et al. | 360/324.11 |
| 5,739,990 A | * | 4/1998 | Ravipati et al. | 360/324.12 |
| 5,748,416 A | * | 5/1998 | Tobise et al. | 360/324.12 |
| 5,910,344 A | * | 6/1999 | Hasegawa et al. | 427/131 X |
| 5,936,810 A | * | 8/1999 | Nakamoto et al. | 360/324.1 |
| 5,992,004 A | * | 11/1999 | Sato et al. | 29/603.14 |
| 6,097,579 A | * | 8/2000 | Gill | 360/324.2 |
| 6,112,402 A | * | 9/2000 | Saito et al. | 29/603.13 |
| 6,444,406 B1 | * | 9/2002 | Ito et al. | 29/603.07 X |
| 6,636,397 B2 | | 10/2003 | Gill | 360/324.12 |
| 6,737,283 B2 | * | 5/2004 | Morgan | 257/295 X |
| 2002/0174533 A1 | * | 11/2002 | Horng et al. | 29/603.08 |
| 2002/0191353 A1 | * | 12/2002 | Sato | 360/324.1 X |
| 2003/0179507 A1 | | 9/2003 | Freitag et al. | 360/322 |

FOREIGN PATENT DOCUMENTS

JP    2001-168416    *    6/2001

OTHER PUBLICATIONS

Hasegawa et al., "Spin-Valves with Antiferromagnetic a-Fe2O3 Layers", IEEE Transactions on Magnetics, vol. 32, No. 5, Sep. 1996, pp. 4618-4620.*

* cited by examiner

*Primary Examiner*—A. Dexter Tugbang
(74) *Attorney, Agent, or Firm*—Saile Ackerman LLC; Stephen B. Ackerman

(57) ABSTRACT

A process is described for the fabrication of a magnetic read head in which contact between the pinned layer and the AFM is limited to their edges. The principal steps are to deposit an antiferromagnetic layer and to then pattern it into a pair of antiferromagnetic layers separated by no more than about 2 microns. A layer of magnetic material that lies between, and is in contact with, said antiferromagnetic layers is then deposited, following which the layer of magnetic material is magnetized.

2 Claims, 4 Drawing Sheets

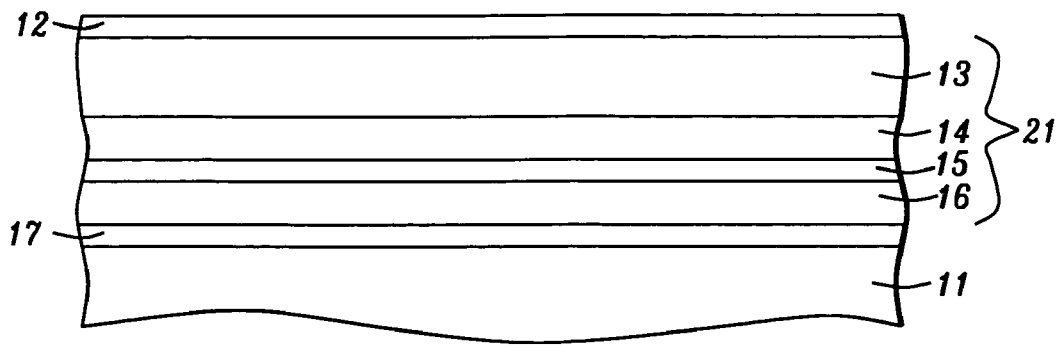
FIG. 1 - Prior Art
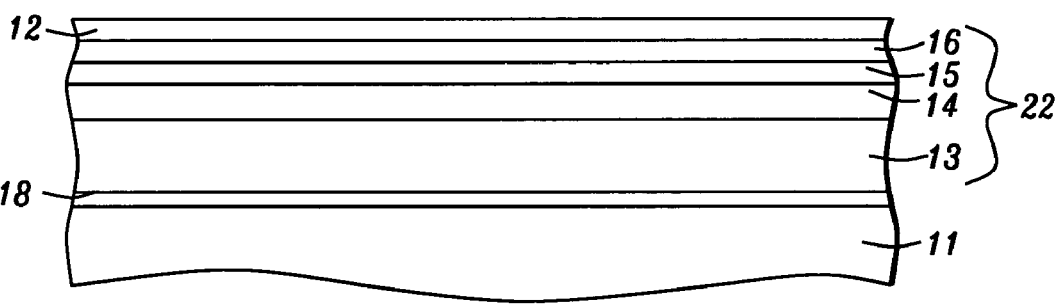
FIG. 2 - Prior Art
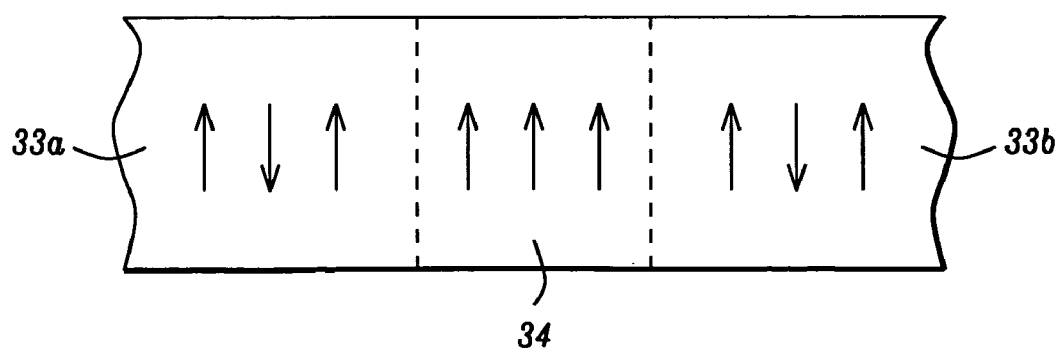
FIG. 3

PROCESS OF MANUFACTURING A SIDE PINNED MAGNETIC RECORDING SENSOR

FIELD OF THE INVENTION

The invention relates to the general field of magnetic spin valves with particular reference to forming and stabilizing pinned layers therein.

BACKGROUND OF THE INVENTION

The principle governing the operation of most current magnetic read heads is the change of resistivity of certain materials in the presence of a magnetic field (magneto-resistance or MR). Magneto-resistance can be significantly increased by means of a structure known as a spin valve or SV. The resulting increase (known as Giant Magneto-Resistance or GMR) derives from the fact that electrons in a magnetized solid are subject to significantly less scattering by the lattice when their own magnetization vectors (due to spin) are parallel (as opposed to anti-parallel) to the direction of magnetization of their environment.

The key elements of a spin valve are a low coercivity (free) ferromagnetic layer, a non-magnetic spacer layer, and a pinned reference ferromagnetic layer. The latter is usually formed out of a soft ferromagnetic layer that is pinned magnetically by a nearby layer of antiferromagnetic (AFM) material. Alternatively, a synthetic antiferromagnet (formed by sandwiching an antiferromagnetic coupling layer between two antiparallel ferromagnetic layers) may be used to replace the ferromagnetic pinned layer.

When the free layer is exposed to an external magnetic field, the direction of its magnetization is free to rotate according to the direction of the external field. After the external field is removed, the magnetization of the free layer will stay at a direction, dictated by the minimum energy state, which is determined by the crystalline and shape anisotropy, current field, coupling field and demagnetization field. If the direction of the pinned field is parallel to the free layer, electrons passing between the free and pinned layers, suffer less scattering. Thus, the resistance in this state is lower. If, however, the magnetization of the pinned layer is anti-parallel to that of the free layer, electrons moving from one layer into the other will suffer more scattering so the resistance of the structure will increase. The change in resistance of a spin valve is typically 8-20%.

Although the layers enumerated above are all that is needed to produce the GMR or TMR effects, additional problems remain. In particular, there are certain noise effects associated with these structures. Magnetization in a layer can be irregular because of reversible breaking of magnetic domain walls, leading to the phenomenon of Barkhausen noise. The solution to this problem has been to provide a device structure conducive to ensuring that the free layer is a single domain so that the domain configuration remains unperturbed after fabrication and under normal operation.

FIG. 1 shows a typical prior art arrangement of the layers that make up an SV. In this example, the AFM and pinned layers are at the top so the device is referred to as a top spin valve (TSV). Seen there are substrate 11 over which lies free layer 16 on its seed layer 17. Pinned layer 14 lies on non-magnetic spacer layer 15 with AFM layer 13 immediately above it. A capping layer 12 completes the structure. It is important to note that, in all such devices of the prior art, the pinning layer contacts the pinned layer over its entire length and breadth.

In FIG. 2 we show an example of a bottom spin valve (BSV). Seen there are substrate 11 over which lies AFM layer 13 on its seed layer 18. Nonmagnetic spacer layer 15 lies on pinned layer 14 with free layer 16 immediately above it. Capping layer 12 completes the structure. As before, it is important to note that, in all such devices of the prior art, the pinning layer contacts the pinned layer over its entire length and breadth.

A routine search of the prior art was performed with the following references of interest being found:

In U.S. Pat. No. 6,636,397 B2, Gill discloses two structures featuring a split AFM layer but in both cases the split AFM layers flank a capping layer and the free layer. The pinned layer (200) is pinned by AFM layer 104 which fully underlies it in the standard way. In US 2003/0179507 Freitag et al. describe AFM layers in wing portions of a spin valve sensor. Their configuration is similar to Gill's, with pinned trilayer 220/222/224 being fully underlaid by AFM layer 216.

SUMMARY OF THE INVENTION

It has been an object of at least one embodiment of the present invention to provide a magnetic read head having greater stability and signal strength than similar devices of the prior art.

Another object of at least one embodiment of the present invention has been to allow the seed layers used for growing the AFM and the pinned layers to be independently optimized.

Yet another object of at least one embodiment of the present invention has been for said magnetic head be feasible in both top and bottom spin valve formats.

Still another object of at least one embodiment of the present invention has been to provide a process for manufacturing said read head.

A further object of at least one embodiment of the present invention has been that said process be fully compatible with existing processes for manufacturing read heads.

These objects have been achieved by limiting contact between the pinned layer and the AFM to their edges. This still allows the pinned layer to be effectively pinned, but without the shunting effect of the AFM layer. Both TSV and BSV structures are disclosed as well as processes for their manufacture.

BRIEF DESCRIPTION OF THE DRAWINGS

FIGS. 1 and 2 show spin valves of the prior art.

FIG. 3 illustrates the basic principle on which the invention is based.

DESCRIPTION OF THE PREFERRED EMBODIMENTS

The basic principle that makes possible the novel design and process of the present invention is illustrated in FIG. 3. Seen there are two AFM layer 33a and 33b separated by a short distance. The pinned layer, whether synthetic or normal, contacts the two halves, 33a and 33b, of the AFM layer, either from below (as in a TSV) or from above (as in a BSV). The pinned layer extends unbroken across all of areas 33a, 33b, and 34, there being no AFM layer above or below region 34. The pinning action of the AFM layers in regions 33a and 33b serves to constrain the reference layer in region 34. The sensor read width is related to the width of region 34 and may be slightly wider or narrower than it, depending on other process factors. Typically, the width of region 34 is less than about 2 microns.

1st Embodiment

Read Head Based on a Top Spin Valve

Figure 4:
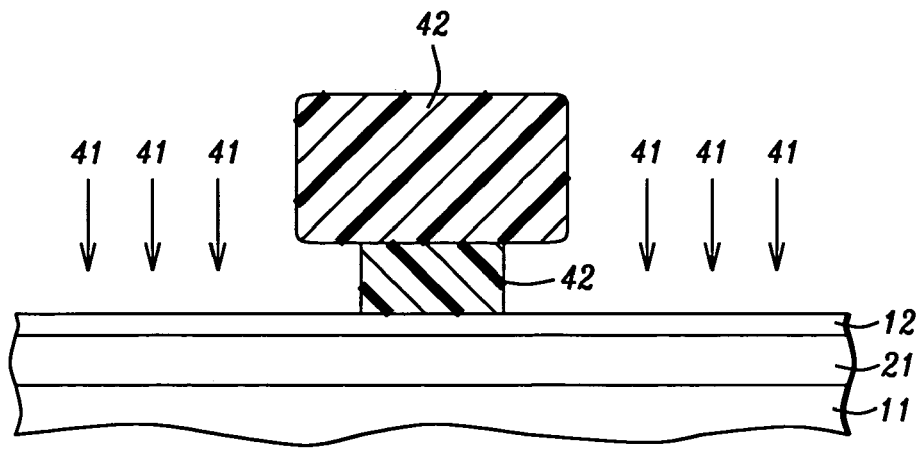
FIGS. 4-6 illustrate a first embodiment of the process for manufacturing a TSV according to the teachings of the invention.
Figure 5:
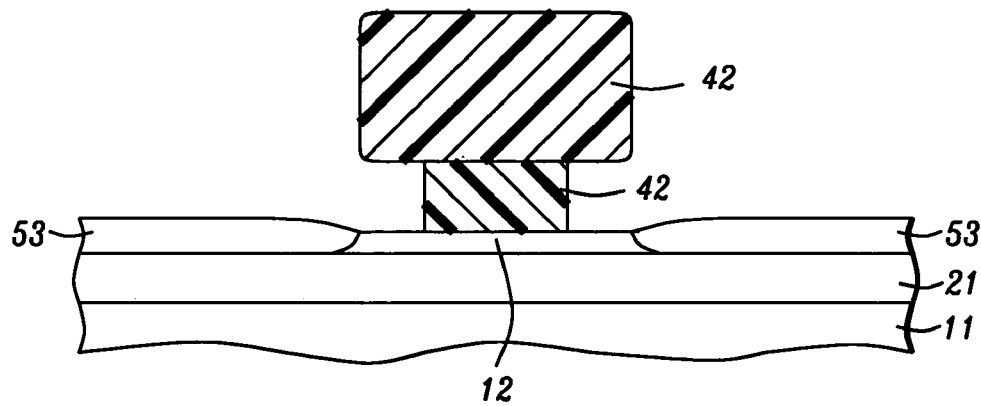

Referring next to FIG. 4, the process to manufacture the first embodiment begins with the deposition of a partial TSV stack 21 (including seed layer 17 which can be seen in FIG. 1) on substrate 11, followed by capping layer 12. By 'partial' we mean all the layers of a conventional TSV EXCEPT the AFM layers. Then liftoff mask 42 is placed on the surface, as shown. A liftoff mask is a bilayer structure of photolithographically patternable material, the upper layer being etch resistant and the lower layer being easy to remove. A vertical etch or milling process is then used to remove all unprotected material as far as the top surface of the (normal or synthetic) pinned layer, following which, with liftoff mask 42 still in place, antiferromagnetic layer 53, that contacts the pinned layer (where it is not under mask 42), is deposited, as shown in FIG. 5.

Figure 6:
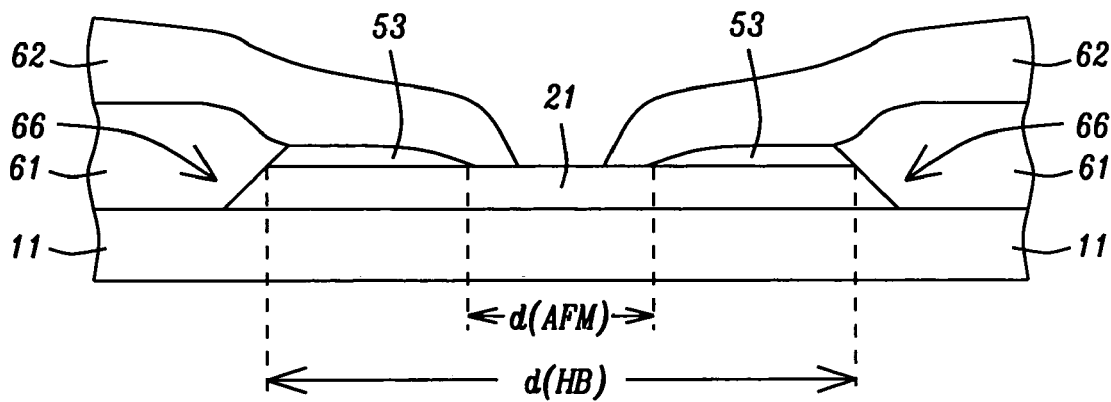

Liftoff mask 42 is then removed and replaced with a second liftoff mask (not shown) which is larger than liftoff mask 42 was. This second liftoff mask is used to first form sloping sidewalls 66 (by ion milling) and then longitudinal bias layer 61 is deposited onto sloping sidewalls 66 following which said the second liftoff mask is removed. The process concludes with the deposition of a pair of opposing conductive leads 62 that contact the TSV, as shown in FIG. 6.

2nd Embodiment

Read Head Based on a Top Spin Valve

The process of the second embodiment begins with deposition onto substrate 11 of seed layer 17, as seen in FIG. 1. Then TSV stack 21 is formed, including pinned layer 14 and AFM layer 13.

Figure 7:
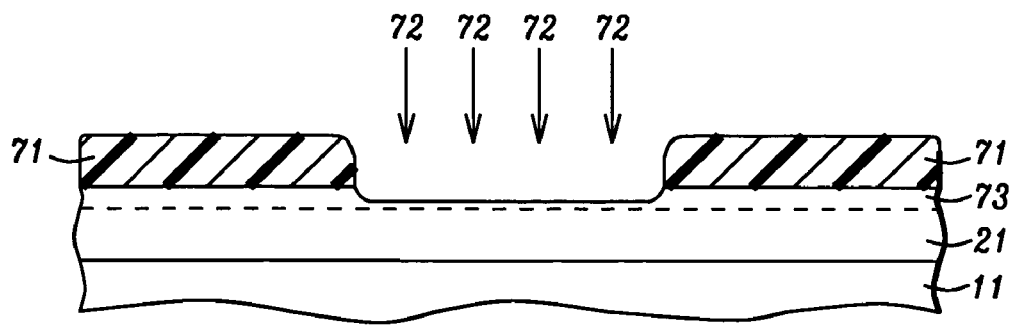
FIGS. 7 and 8 illustrate a second embodiment of the process for manufacturing a TSV according to the teachings of the invention.

Referring now to FIG. 7, conventional (single layer) contact mask 71 is formed on antiferromagnetic layer 13 (as in FIG. 1) to define an active area for the device, following which etchant 72 is applied so that all unmasked areas are removed as far as, but not including, pinned layer 14. It is not necessary to remove all of AFM layer 13 provided any residual thickness of 13 does not make the total structure too thick. Most of the pinning will still derive from the AFM side panels 73 which are all that remains of layer 13 after patterning.

Figure 8:
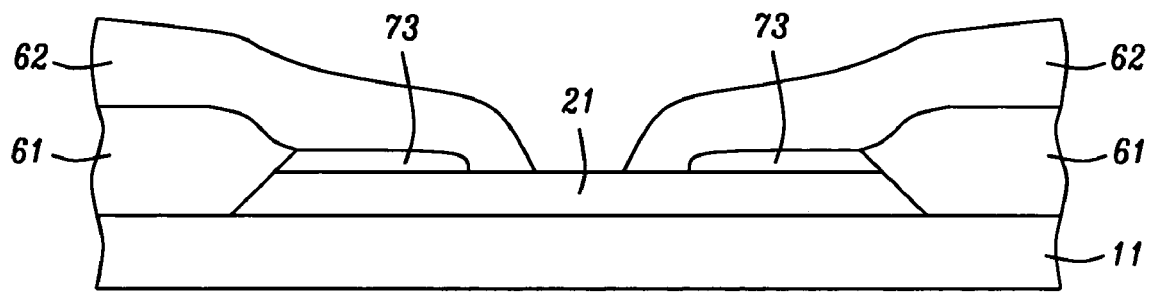

Once mask 71 has been removed the process continues as for the first embodiment leading to the structure illustrated in FIG. 8.

3rd Embodiment

Read Head Based on a Bottom Spin Valve

Figure 9:
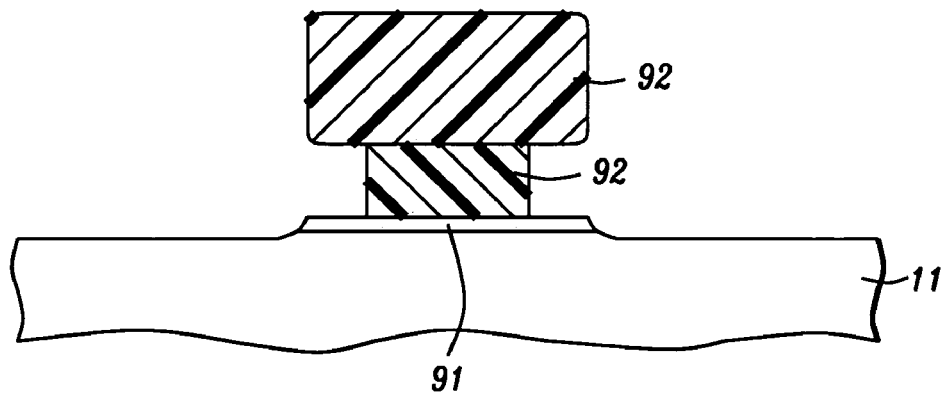
FIGS. 9-11 illustrate a process for manufacturing a BSV according to the teachings of the invention.
Figure 10:
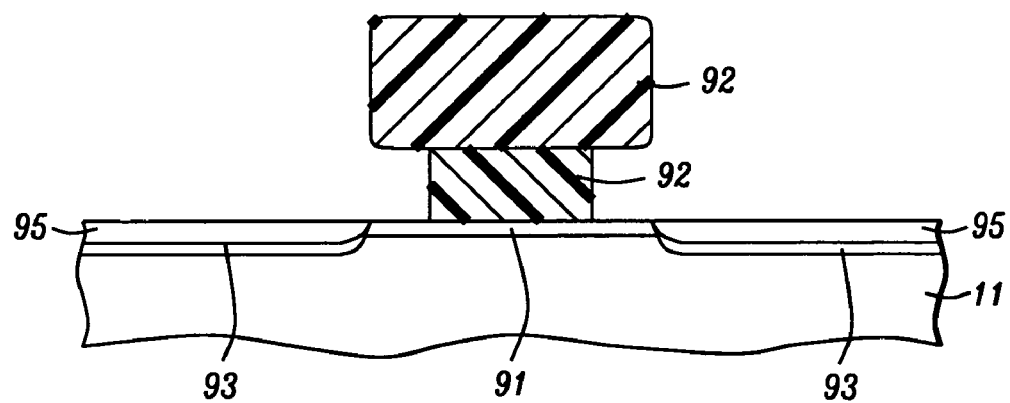
Figure 11:
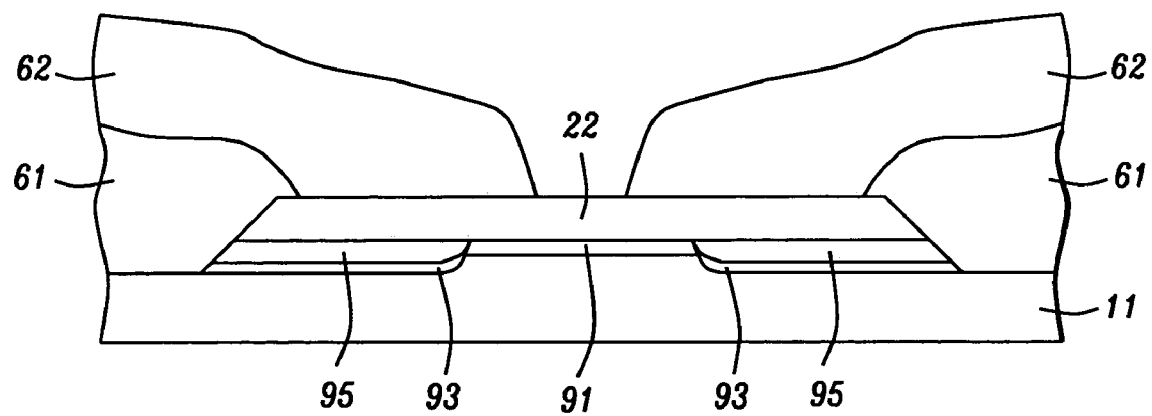

Referring now to FIG. 9, the process of the third embodiment begins with depositing seed layer 91 (chosen to be optimum for a pinned and subsequent layers) on substrate 11. Liftoff mask 92 is then patterned onto layer 91 following which ion milling is used to remove a portion of 11 so that, dose to the mask, it has sloping sidewalls. With liftoff mask 92 still in place, second seed layer 93 (chosen to be optimum for an AFM layer) is deposited onto the previously etched substrate 11, including its sloping sidewalls, as seen in FIG. 10.

With liftoff mask 92 continuing to be in place, antiferromagnetic layer 95 is deposited onto second seed layer 93 and liftoff mask 92 is then removed.

To complete the process, BSV stack 22 (FIG. 2 without the AFM layer) is laid down followed by the formation of bias pairs 61 and conductive leads 62.

Additional Comments:

The AFM on the sides of the sensor serves to define the antiparallel (AP) orientation of the pinned layer for the full AP trilayer as well as the sensor center region. As there is no AFM shunting in the dominant active (center) region, the signal amplitude will be higher than for a conventional design. Furthermore, the sensor can be expected to be more stable than a conventional design as the AFM/lead region does not heat up during ESD (electrostatic discharge), EOS (electrical over-stress), or normal operation. As the AFM is not thermally stressed, it will not experience thermal stability problems, as can occur in conventional designs. Additionally, the AFM layer can be made thicker with no penalty, or otherwise optimized differently in ways that could not be done for conventional designs. Another advantage is that the center GMR stack height is thinner, facilitating smaller shield-to-shield spacings.

For both TSV and BSV designs, complete removal of the AFM layer may not be essential. For example, 90% removal will eliminate 90% for the AFM shunting, so most of the benefit is still realized. For BSV, different seed layers can be used for the center sensor region and the AFM region, which allows some additional optimization.

An important feature of the invention is that precise alignment between the AFM free width and the lead free width (Mrt) is not hypercritical since some encroachment of AFM film into the active area results only in slightly reduced signal. If the AFM inner window width is d(AFM), see FIG. 6, the lead width is MrT, and the hard bias (or similar stabilization such as exchange) width is called d(HB), then it is a requirement of the invention that d(AFM)<d(HB). Mrt may be smaller or larger than d(AFM), or may not even apply if the head is not of the LOL (lead overlay) type.

What is claimed is:

1. A method to form a magnetically pinned reference layer for a bottom spin valve, comprising:
   providing a layer of antiferromagnetic material having a central section that abuts a pair of opposing outer sections, said central section having a first top surface and said outer sections having second top surfaces; and
   depositing a layer of magnetic material, a part of which contacts only said second top surfaces, thereby forming said magnetically pinned reference layer, only a part of which makes contact with said layer of antiferromagnetic material.

2. The method of claim 1 wherein said pinned reference layer comprises a pair of ferromagnetic layers separated by, and contacting, an antiferromagnetic coupling layer.

* * * * *